United States Patent
Kubota et al.

(10) Patent No.: US 9,038,684 B2
(45) Date of Patent: May 26, 2015

(54) PNEUMATIC TIRE UNIT

(71) Applicant: The Yokohama Rubber Co., LTD., Minato-ku, Tokyo (JP)

(72) Inventors: Masataka Kubota, Hiratsuka (JP); Masatoshi Kuwajima, Hiratsuka (JP); Masataka Koishi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 124 days.

(21) Appl. No.: 13/630,881

(22) Filed: Sep. 28, 2012

(65) Prior Publication Data
US 2014/0008000 A1    Jan. 9, 2014

(30) Foreign Application Priority Data
Sep. 28, 2011   (JP) .................. 2011-213363

(51) Int. Cl.
 B60C 13/00 (2006.01)
 B60C 13/02 (2006.01)
 B60C 19/00 (2006.01)

(52) U.S. Cl.
 CPC .............. B60C 13/02 (2013.01); B60C 19/001 (2013.01)

(58) Field of Classification Search
None
See application file for complete search history.

(56) References Cited

U.S. PATENT DOCUMENTS 5,373,886 A * 12/1994 Yamaguchi et al. .......... 152/531

FOREIGN PATENT DOCUMENTS

| GB | 1557417 | * 12/1979 |
|----|---------|-----------|
| JP | 2002-178713 | 6/2002 |
| JP | 2004-359099 | * 12/2004 |
| JP | 2008-001249 | 1/2008 |
| JP | 2008-302740 | 12/2008 |
| JP | 2009-018677 | 1/2009 |
| JP | 2010-030547 | 2/2010 |
| JP | 2010-132045 | 6/2010 |
| JP | 2010-173509 | 8/2010 |
| JP | 2010-260376 | 11/2010 |
| JP | 2010-260377 | 11/2010 |
| JP | 2010-260378 | 11/2010 |
| JP | 2011-105171 | 6/2011 |
| JP | 2011-168219 | 9/2011 |

OTHER PUBLICATIONS

Machine translation of JP 2004-359099, 2004.*

* cited by examiner

*Primary Examiner* — Justin Fischer
(74) *Attorney, Agent, or Firm* — Thorpe North & Western

(57) ABSTRACT

A pneumatic tire unit comprises a front tire to be mounted on a leading side of a vehicle, and a rear tire to be mounted on a trailing side of the vehicle. A plurality of recesses is provided in at least one tire side portion of the front tire, and a plurality of protrusions is provided on at least one tire side portion of the rear tire. A negative pressure region that can be generated at a back surface side of the vehicle is reduced and, therefore, air resistance of the vehicle is reduced and fuel economy is enhanced.

18 Claims, 16 Drawing Sheets

| | | Conv. Ex. | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Front tire | Vehicle inner side | None | Protrusions | Recesses | None | None | Protrusions | Recesses | Protrusions |
| | Vehicle outer side | None | Protrusions | Recesses | None | None | Protrusions | Recesses | Protrusions |
| Rear tire | Vehicle inner side | None | None | None | Protrusions | Recesses | Protrusions | Recesses | Recesses |
| | Vehicle outer side | None | None | None | Protrusions | Recesses | Protrusions | Recesses | Recesses |
| Presence/absence of disposal between maximum width position and ground contact edge | Front tire | - | ○ | ○ | - | - | ○ | ○ | ○ |
| | Rear tire | - | - | - | ○ | ○ | ○ | ○ | ○ |
| Height of protrusions mm | | - | 3.0 | - | 3.0 | - | 3.0 | - | 3.0 |
| Change in volume of recesses in tire radial direction | | - | Uniform | Uniform | Uniform | Uniform | Uniform | Uniform | Uniform |
| Depth of recesses mm | | - | - | 3.0 | - | 3.0 | - | 3.0 | 3.0 |
| Maximum diameter dimension of recesses mm | | - | - | 5.0 | - | 5.0 | - | 5.0 | 5.0 |
| Fuel economy | | 100.0 | 100.2 | 100.4 | 100.3 | 100.2 | 100.5 | 100.6 | 100.4 |

FIG. 22

|  |  | Working Example 1 | Working Example 2 | Working Example 3 | Working Example 4 | Working Example 5 | Working Example 6 | Working Example 7 |
|---|---|---|---|---|---|---|---|---|
| Front tire | Vehicle inner side | Recesses | Recesses | Recesses | Recesses | Recesses | Recesses | Recesses |
|  | Vehicle outer side | None | None | None | None | None | None | None |
| Rear tire | Vehicle inner side | None | None | None | None | None | None | None |
|  | Vehicle outer side | Protrusions | Protrusions | Protrusions | Protrusions | Protrusions | Protrusions | Protrusions |
| Presence/absence of disposal between maximum width position and ground contact edge | Front tire | × | × | ○ | × | ○ | ○ | ○ |
|  | Rear tire | × | × | × | ○ | ○ | ○ | ○ |
| Height of protrusions mm |  | 0.5 | 10.0 | 3.0 | 3.0 | 3.0 | 3.0 | 3.0 |
| Change in volume of recesses in tire radial direction |  | Uniform | Uniform | Uniform | Uniform | Uniform | Increase toward outer side in the tire radial direction | Increase toward inner side in the tire radial direction |
| Depth of recesses mm |  | 0.5 | 5.0 | 3.0 | 3.0 | 3.0 | 3.0 | 3.0 |
| Maximum diameter dimension of recesses mm |  | 1.0 | 8.0 | 5.0 | 5.0 | 5.0 | 5.0 | 5.0 |
| Fuel economy |  | 102.1 | 102.1 | 102.3 | 102.3 | 102.4 | 102.5 | 102.4 |

FIG. 23

|  |  | Working Example 8 | Working Example 9 | Working Example 10 | Working Example 11 | Working Example 12 | Working Example 13 |
|---|---|---|---|---|---|---|---|
| Front tire | Vehicle inner side | None | None | None | None | None | None |
|  | Vehicle outer side | Recesses | Recesses | Recesses | Recesses | Recesses | Recesses |
| Rear tire | Vehicle inner side | None | None | None | None | None | None |
|  | Vehicle outer side | Protrusions | Protrusions | Protrusions | Protrusions | Protrusions | Protrusions |
| Presence/absence of disposal between maximum width position and ground contact edge | Front tire | × | ○ | × | ○ | ○ | ○ |
|  | Rear tire | × | × | ○ | ○ | ○ | ○ |
| Height of protrusions mm | | 3.0 | 3.0 | 3.0 | 3.0 | 3.0 | 3.0 |
| Change in volume of recesses in tire radial direction | | Uniform | Uniform | Uniform | Uniform | Increase toward outer side in the tire radial direction | Increase toward inner side in the tire radial direction |
| Depth of recesses mm | | 3.0 | 3.0 | 3.0 | 3.0 | 3.0 | 3.0 |
| Maximum diameter dimension of recesses mm | | 5.0 | 5.0 | 5.0 | 5.0 | 5.0 | 5.0 |
| Fuel economy | | 102.5 | 102.7 | 102.6 | 102.8 | 102.9 | 102.8 |

FIG. 24

|  |  | Working Example 14 | Working Example 15 | Working Example 16 | Working Example 17 | Working Example 18 | Working Example 19 |
|---|---|---|---|---|---|---|---|
| Front tire | Vehicle inner side | Recesses | Recesses | Recesses | Recesses | Recesses | Recesses |
|  | Vehicle outer side | None | None | None | None | None | None |
| Rear tire | Vehicle inner side | Protrusions | Protrusions | Protrusions | Protrusions | Protrusions | Protrusions |
|  | Vehicle outer side | None | None | None | None | None | None |
| Presence/absence of disposal between maximum width position and ground contact edge | Front tire | × | ○ | × | ○ | ○ | ○ |
|  | Rear tire | ○ | × | ○ | ○ | ○ | ○ |
| Height of protrusions mm |  | 3.0 | 3.0 | 3.0 | 3.0 | 3.0 | 3.0 |
| Change in volume of recesses in tire radial direction |  | Uniform | Uniform | Uniform | Uniform | Increase toward outer side in the tire radial direction | Increase toward inner side in the tire radial direction |
| Depth of recesses mm |  | 3.0 | 3.0 | 3.0 | 3.0 | 3.0 | 3.0 |
| Maximum diameter dimension of recesses mm |  | 5.0 | 5.0 | 5.0 | 5.0 | 5.0 | 5.0 |
| Fuel economy |  | 102.4 | 102.5 | 102.6 | 102.7 | 102.8 | 102.7 |

FIG. 25

| | | Working Example 20 | Working Example 21 | Working Example 22 | Working Example 23 | Working Example 24 | Working Example 25 | Working Example 26 |
|---|---|---|---|---|---|---|---|---|
| Front tire | Vehicle inner side | None | None | None | None | None | None | Recesses |
| | Vehicle outer side | Recesses | Recesses | Recesses | Recesses | Recesses | Recesses | Recesses |
| Rear tire | Vehicle inner side | Protrusions | Protrusions | Protrusions | Protrusions | Protrusions | Protrusions | Protrusions |
| | Vehicle outer side | None | None | None | None | None | None | Protrusions |
| Presence/absence of disposal between maximum width position and ground contact edge | Front tire | × | ○ | × | ○ | ○ | ○ | × |
| | Rear tire | × | × | ○ | ○ | ○ | ○ | × |
| Height of protrusions mm | | 3.0 | 3.0 | 3.0 | 3.0 | 3.0 | 3.0 | 3.0 |
| Change in volume of recesses in tire radial direction | | Uniform | Uniform | Uniform | Uniform | Increase toward outer side in the tire radial direction | Increase toward inner side in the tire radial direction | Uniform |
| Depth of recesses mm | | 3.0 | 3.0 | 3.0 | 3.0 | 3.0 | 3.0 | 3.0 |
| Maximum diameter dimension of recesses mm | | 5.0 | 5.0 | 5.0 | 5.0 | 5.0 | 5.0 | 5.0 |
| Fuel economy | | 102.7 | 102.9 | 102.9 | 103.1 | 103.2 | 103.1 | 102.9 |

FIG. 26

| | | Working Example 27 | Working Example 28 | Working Example 29 | Working Example 30 | Working Example 31 | Working Example 32 | Working Example 33 |
|---|---|---|---|---|---|---|---|---|
| Front tire | Vehicle inner side | Recesses | Recesses | Recesses | Recesses | Recesses | None | None |
| | Vehicle outer side | Recesses | Recesses | Recesses | Recesses | Recesses | Recesses | Recesses |
| Rear tire | Vehicle inner side | Protrusions | Protrusions | Protrusions | Protrusions | Protrusions | Protrusions | Protrusions |
| | Vehicle outer side | Protrusions | Protrusions | Protrusions | Protrusions | Protrusions | Recesses | Recesses |
| Presence/absence of disposal between maximum width position and ground contact edge | Front tire | ○ | × | ○ | ○ | ○ | × | ○ |
| | Rear tire | × | ○ | ○ | ○ | ○ | × | ○ |
| Height of protrusions mm | | 3.0 | 3.0 | 3.0 | 3.0 | 3.0 | 3.0 | 3.0 |
| Change in volume of recesses in tire radial direction | | Uniform | Uniform | Uniform | Increase toward outer side in the tire radial direction | Increase toward inner side in the tire radial direction | Uniform | Uniform |
| Depth of recesses mm | | 3.0 | 3.0 | 3.0 | 3.0 | 3.0 | 3.0 | 3.0 |
| Maximum diameter dimension of recesses mm | | 5.0 | 5.0 | 5.0 | 5.0 | 5.0 | 5.0 | 5.0 |
| Fuel economy | | 103.1 | 103.1 | 103.3 | 103.4 | 103.3 | 102.9 | 103.3 |

FIG. 27

PNEUMATIC TIRE UNIT

PRIORITY CLAIM

Priority is claimed to Japan Patent Application Serial No. 2011-213363 filed on Sep. 28, 2011.

BACKGROUND

1. Technical Field

The present technology relates to a pneumatic tire and particularly relates to a pneumatic tire unit by which air flow around a tire can be improved.

2. Related Art

Japanese Unexamined Patent Application Publication No. 2010-260376A describes a conventional pneumatic tire including both a plurality of concave portions (recesses) and a plurality of convex portions (protrusions) throughout a tire circumferential direction and a tire radial direction in a predetermined region of a tire outer side surface for the purposes of effectively reducing air resistance around the tire and improving the fuel economy of a vehicle on which the tire is mounted.

Additionally, Japanese Unexamined Patent Application Publication No. 2010-30547A describes a conventional pneumatic tire including a plurality of concave portions (dimples) and convex portions (pimples) as agitators on a tire outer side surface (outer surface of side portions) for the purpose of preventing reduction in durability caused by heat buildup.

With the pneumatic tires described in Japanese Unexamined Patent Application Publication No. 2010-260376A and Japanese Unexamined Patent Application Publication No. 2010-30547A, it is recited that turbulent flow (agitation of air) around the tire is generated by the concave portions when the vehicle is traveling, and an increase in the effects of generating turbulent air (agitation effects) is sought by the convex portions. That is, the concave portions are described as portions that cause turbulent flow or agitate the air, and the convex portions are described as portions that promote the turbulent flow or agitation of the air.

However, in cases when a vehicle on which pneumatic tires are mounted travels, the air separating from the pneumatic tire on a leading side of the vehicle tends to expand toward the outer side of the vehicle; and the air separating from the pneumatic tire on a trailing side of the vehicle is prone to collect due to the influence of a wheel housing or vehicle components and tends to expand toward the outer side of the vehicle. Therefore, a negative pressure region on a back surface side of the vehicle enlarges, which becomes air resistance.

SUMMARY

The present technology provides a pneumatic tire unit by which air flow around the tire can be improved and fuel economy can be further enhanced. A pneumatic tire unit of the present technology includes a front tire to be mounted on a leading side of a vehicle and a rear tire to be mounted on a trailing side of the vehicle. With such a pneumatic tire unit, a plurality of recesses is provided in at least one tire side portion of the front tire, and a plurality of protrusions is provided on at least one tire side portion of the rear tire.

Air flow from the leading side toward the trailing side of the vehicle is generated by the traveling of the vehicle. At the front tire, passing air is agitated by the recesses and a turbulent flow boundary layer is generated at the tire side portion of the front tire. As a result, the expansion of air toward the outer side of the vehicle is suppressed. On the other hand, at the rear tire, passing air is agitated by the protrusion and a turbulent flow boundary layer is generated at the tire side portion of the rear tire. As a result, the expansion of air toward the outer side of the vehicle is suppressed. Moreover, at the rear tire, the air is agitated and rectified by the protrusions. Thereby, air will not easily collect and will be expelled backwards without being influenced by wheel housings or vehicle components. As a result, a negative pressure region that can be generated at a back surface side of the vehicle is reduced, and air resistance of the vehicle is reduced. Therefore, fuel economy can be enhanced.

With the pneumatic tire unit of the present technology, a vehicle inner/outer orientation when mounted on a vehicle is indicated, and the recesses are provided in at least the tire side portion of a vehicle outer side of the front tire.

According to this pneumatic tire unit, because the separation of air on the vehicle outer side is greater than that on the vehicle inner side, the recesses are provided in the tire side portion of the vehicle outer side of the front tire and, thereby, a prominent effect of suppressing the expansion of air to the outer side of the vehicle can be obtained. As a result, the air resistance of the vehicle is further reduced and, therefore, fuel economy can be even further enhanced.

With the pneumatic tire unit of the present technology, a vehicle inner/outer orientation when mounted on a vehicle is indicated, and the protrusions are provided on at least the tire side portion of a vehicle inner side of the rear tire.

According to this pneumatic tire unit, because air tends to collect more easily on the vehicle inner side than on the vehicle outer side, the protrusions are provided on the tire side portion of the vehicle inner side of the rear tire and, thereby a prominent effect of expelling air backwards without being influenced by the wheel housings or the vehicle components can be obtained. As a result, the air resistance against the vehicle is further reduced and, therefore, fuel economy can be even further enhanced.

With the pneumatic tire unit of the present technology, the recesses are provided at least between a maximum tire width position and a ground contact edge.

The region between the maximum tire width position and the ground contact edge in the tire side portion is a region on an outer side in the tire radial direction of the tire side portion, and air flow that recirculates from the side first arrives at this region. Therefore, by providing the recesses in said region of the front tire, the separation of air can be suppressed at an early stage, a point where the air separates can be offset farther backwards, and the flow of air can be retained near the vehicle. Therefore, a prominent effect of suppressing the expansion of air to the outer side of the vehicle can be obtained.

With the pneumatic tire unit of the present technology, the protrusions are provided at least between a maximum tire width position and a ground contact edge.

The region between the maximum tire width position and the ground contact edge in the tire side portion is a region on an outer side in the tire radial direction of the tire side portion, and rotation speed of this region in the tire side portion is relatively fast. Therefore, by providing the protrusions in said region of the rear tire, more turbulent flow can be generated, and a prominent effect of expelling air backwards without being influenced by the wheel housings or the vehicle components can be obtained.

With the pneumatic tire unit of the present technology, a protruding height of the protrusions is not less than 0.5 mm and not more than 10.0 mm.

If the height of the protrusions is less than 0.5 mm, a range of the protrusions that contacts the flow of air will be small and, as a result, it will be difficult to make the flow of air at the back of the protrusions turbulent and the effect of reducing the air resistance of the vehicle will decline. Additionally, if the height of the protrusions exceeds 10 mm, the range of the protrusions that contacts the flow of air will be large and, as a result, the flow of air at the back of the protrusions will tend to expand and the effect of reducing the air resistance of the vehicle will decline. On this point, according to the pneumatic tire unit of the present technology, the protrusions appropriately contact the flow of air and, thereby, the flow of air at the back of the protrusions is made appropriately turbulent. Therefore, a prominent effect of expelling air backwards can be obtained.

With the pneumatic tire unit of the present technology, the recesses are disposed so that a volume progressively varies in a tire radial direction.

The outer side in the tire radial direction is where air flow that recirculates from the side first arrives. Therefore, by disposing the recesses such that the volume varies so as to progressively increase in the tire radial direction, the separation of air can be suppressed at an early stage, a point where the air separates can be offset farther backwards, and the flow of air can be retained near the vehicle. Therefore, a prominent effect of suppressing the expansion of air to the outer side of the vehicle can be obtained. Additionally, rotation speed of the outer side in the tire radial direction in the tire side portion is relatively fast. Therefore, by disposing the recesses such that the volume varies so as to progressively increase in the tire radial direction, more turbulent flow can be generated and a prominent effect of suppressing the expansion of air to the outer side of the vehicle can be obtained.

On the other hand, the rotation speed of the tire side portion becomes relatively slow with proximity to the inner side in the tire radial direction and, therefore, the volume of the recesses closer to this region is made larger. As a result, even though the rotation speed at the inner side in the tire radial direction is slow, turbulent flow can be generated and a prominent effect of suppressing the expansion of air to the outer side of the vehicle can be obtained. Moreover, the inner side in the tire radial direction of the tire side portion is a region in which a large amount of deformation occurs due to compression of the tire and heat buildup is relatively great. Therefore, by configuring the volume of the recesses to be great in this region, the flow of air on the surface of the tire side portion can be pulled in, and an effect of enhancing heat dissipation can be obtained.

With the pneumatic tire unit of the present technology, a depth of the recesses is not less than 0.5 mm and not more than 5.0 mm.

If the depth of the recesses is less than 0.5 mm, a range where an inner surface of the recesses contacts the air will be small and, as a result, it will be difficult to make the flow of air turbulent. Additionally, if the depth of the recesses exceeds 5.0 mm, the range where the inner surface of the recesses contacts the flow of air will be excessive and, in addition to the air resistance tending to increase, the original rubber volume in the region where the recesses are provided will be increased in order to accommodate the depth of the recesses, which will lead to an increase in tire weight. On this point, according to the pneumatic tire unit of the present technology, the inner surface of the recesses appropriately contacts the air and, therefore, the flow of air can be appropriately made turbulent. As a result, a prominent effect of reducing the air resistance of the vehicle can be obtained.

With the pneumatic tire unit of the present technology, a maximum diameter dimension of openings of the recesses is not less than 1.0 mm and not more than 8.0 mm.

If the maximum diameter dimension of the recesses is less than 1.0 mm, the range of the recesses that contacts the air will be small and, as a result, it will be difficult to make the flow of air turbulent. On the other hand, if the maximum diameter dimension of the recesses exceeds 8.0 mm, the range of the recesses that contacts the air will be excessive, and air resistance will tend to increase. On this point, according to the pneumatic tire unit of the present technology, the recesses appropriately contact the air and, therefore, the flow of air can be appropriately made turbulent. As a result, a prominent effect of reducing the air resistance of the vehicle can be obtained.

With the pneumatic tire unit according to the present technology, air flow around a tire can be improved and fuel economy can be further enhanced.

BRIEF DESCRIPTION OF THE DRAWINGS

FIG. 22 is a table showing results of performance testing of pneumatic tires according to examples of the present technology.

FIG. 23 is a table showing results of performance testing of pneumatic tires according to examples of the present technology.

FIG. 24 is a table showing results of performance testing of pneumatic tires according to examples of the present technology.

FIG. 25 is a table showing results of performance testing of pneumatic tires according to examples of the present technology.

FIG. 26 is a table showing results of performance testing of pneumatic tires according to examples of the present technology.

FIG. 27 is a table showing results of performance testing of pneumatic tires according to examples of the present technology.

DETAILED DESCRIPTION

An embodiment of the present technology is described below in detail based on the drawings. However, the present technology is not limited to this embodiment. The constituents of the embodiment include constituents that can be easily replaced by those skilled in the art and constituents substantially same as the constituents of the embodiment. Furthermore, a plurality of modified examples that are described in the embodiment can be freely combined within a scope of obviousness for a person skilled in the art.

Figure 1:
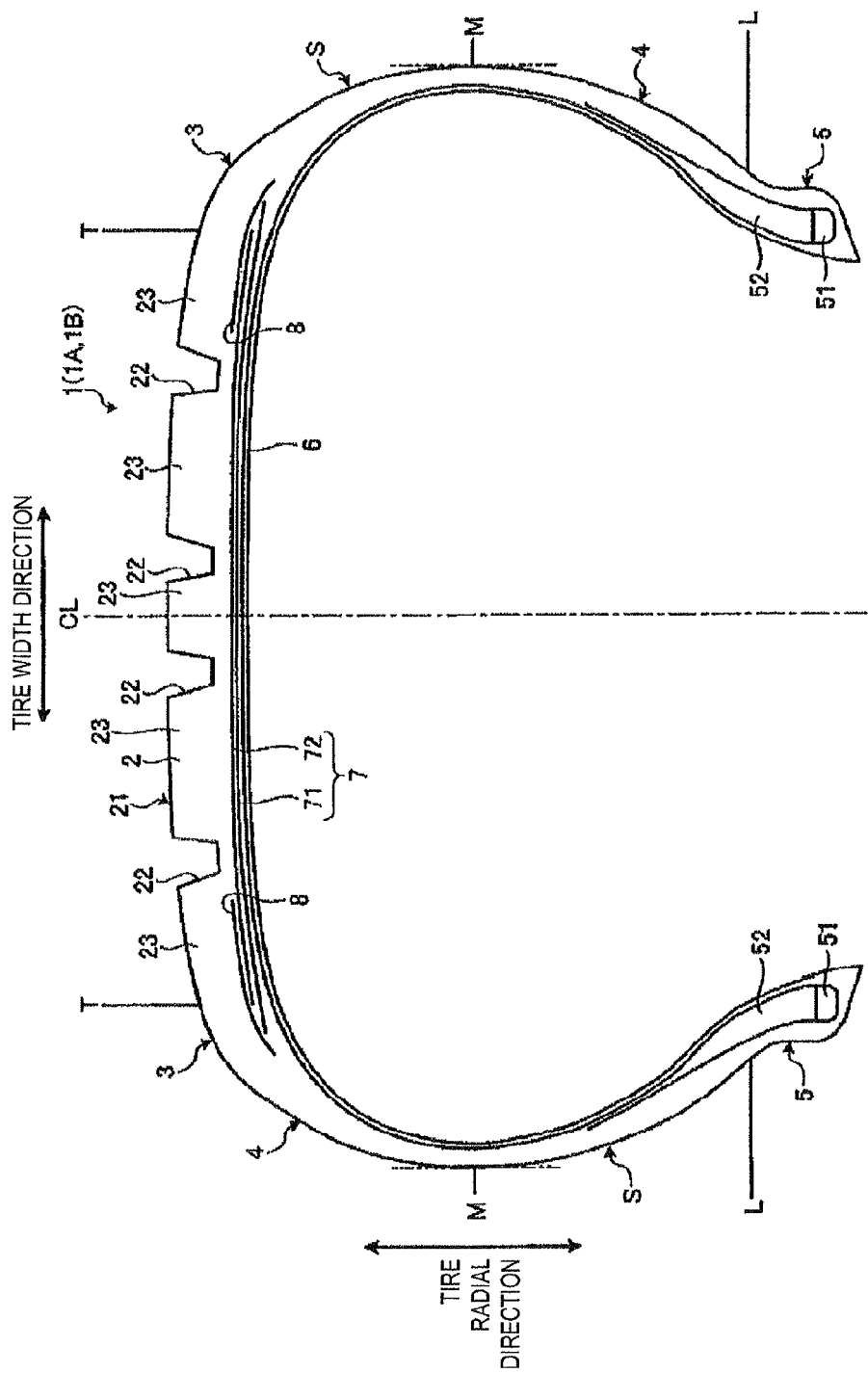
FIG. 1 is a meridian cross-sectional view of a pneumatic tire of a pneumatic tire unit according to an embodiment of the present technology.

FIG. 1 is a meridian cross-sectional view of a pneumatic tire of a pneumatic tire unit according to an embodiment of the present technology. In the following description, "tire radial direction" refers to a direction orthogonal to the rotational axis (not shown) of the pneumatic tire 1; "inner side in the tire radial direction" refers to the side facing the rotational axis in the tire radial direction; and "outer side in the tire radial direction" refers to the side distanced from the rotational axis in the tire radial direction. "Tire circumferential direction" refers to a circumferential direction with the rotational axis as a center axis. Additionally, "tire width direction" refers to the direction parallel to the rotational axis; "inner side in the tire width direction" refers to the side facing a tire equatorial plane CL (tire equator line) in the tire width direction; and "outer side in the tire width direction" refers to the side distanced from the tire equatorial plane CL in the tire width direction. "Tire equatorial plane CL" refers to a plane that is orthogonal to the rotational axis of the pneumatic tire 1 and that passes through a center of a tire width of the pneumatic tire 1. The tire width is a width in the tire width direction between constituents located to the outside in the tire width direction, or in other words, the distance between the constituents that are most distant in the tire width direction from the tire equatorial plane CL. "Tire equator line" refers to a line along the tire circumferential direction of the pneumatic tire 1 that lies on the tire equatorial plane CL. In this embodiment, "tire equator line" is given the same "CL" reference symbol as that used for the tire equatorial plane.

As illustrated in FIG. 1, the pneumatic tire 1 of this embodiment includes a tread portion 2, shoulder portions 3 on both sides of the tread portion 2, and a side wall portion 4 and a bead portion 5 continuing sequentially from each of the shoulder portions 3. Additionally, the pneumatic tire 1 includes a carcass layer 6, a belt layer 7, and a belt reinforcing layer 8.

The tread portion 2 is formed from a rubber material (tread rubber), is exposed on the outermost side in the tire radial direction of the pneumatic tire 1, and a surface thereof constitutes a profile of the pneumatic tire 1. A tread surface 21 is formed on a peripheral surface of the tread portion 2 or, rather, on a road contact surface that contacts a road surface when traveling. The tread surface 21 extends along the tire circumferential direction, and a plurality (four in this embodiment) of main grooves 22 that are straight main grooves parallel with the tire equator line CL are provided in the tread surface 21. Moreover, a plurality of rib-like land portions 23 extending along the tire circumferential direction and parallel with the tire equator line CL is formed in the tread surface 21 by the plurality of main grooves 22. Additionally, while not explicitly illustrated in the drawings, lug grooves that intersect with the main grooves 22 in each of the land portions 23 are provided in the tread surface 21. The land portions 23 are plurally divided in the tire circumferential direction by the lug grooves. Additionally, the lug grooves are formed so as to open to an outermost side in the tire width direction of the tread portion 2, that is, the outer side in the tire width direction. Note that the lug grooves may have a form that communicates with the main grooves 22 or may have a form that does not communicate with the main grooves 22.

The shoulder portions 3 are locations on both outer sides in the tire width direction of the tread portion 2. Additionally, the side wall portions 4 are exposed at an outermost side in the tire width direction of the pneumatic tire 1. The bead portions 5 include a bead core 51 and a bead filler 52. The bead core 51 is formed by winding a steel wire (bead wire) in a ring-like manner. The bead filler 52 is a rubber material that is disposed in space formed by ends of the carcass layer 6 in the tire width direction being folded up at a position of the bead core 51.

The ends of the carcass layer 6 in the tire width direction are folded over the pair of bead cores 51 from the inner side in the tire width direction to the outer side in the tire width direction, and the carcass layer 6 is stretched in a toroidal shape in the tire circumferential direction to form the framework of the tire. The carcass layer 6 is constituted by a plurality of carcass cords (not illustrated) juxtaposed in the tire circumferential direction along the tire meridian direction having a given angle with respect to the tire circumferential direction, and covered by a coating rubber. The carcass cords are formed from organic fibers (e.g. polyester, rayon, nylon, or the like). At least one layer of this carcass layer 6 is provided.

The belt layer 7 has a multi-layer structure where at least two layers (belts 71 and 72) are stacked; is disposed on an outer side in the tire radial direction that is the periphery of the carcass layer 6, in the tread portion 2; and covers the carcass layer 6 in the tire circumferential direction. The belts 71 and 72 are constituted by a plurality of cords (not illustrated) juxtaposed at a predetermined angle with respect to the tire circumferential direction (e.g. from 20 degrees to 30 degrees), and covered by a coating rubber. The cords are formed from steel or organic fibers (e.g. polyester, rayon, nylon, or the like). Moreover, the overlapping belts 71 and 72 are disposed so that the cords thereof mutually cross.

The belt reinforcing layer 8 is disposed on the outer side in the tire radial direction that is the periphery of the belt layer 7, and covers the belt layer 7 in the tire circumferential direction. The belt reinforcing layer 8 is constituted by a plurality of cords (not illustrated), juxtaposed in the tire width direction and substantially parallel (±5 degrees) to the tire circumferential direction, which are covered by a coating rubber. The cords are formed from steel or organic fibers (e.g. polyester, rayon, nylon, or the like). The belt reinforcing layer 8 illustrated in FIG. 1 is disposed so as to cover end portions in the tire width direction of the belt layer 7. The configuration of the belt reinforcing layer 8 is not limited to that described above. While not explicitly illustrated in the drawings, a configuration may be used where the belt reinforcing layer 8 is disposed so as to cover an entirety of the belt layer 7. Alternatively, for example, a configuration may be used where the belt reinforcing layer 8 has two reinforcing layers, where the belt reinforcing layer 8 is formed so that the reinforcing layer on the inner side in the tire radial direction is longer in the tire width direction than the belt layer 7 and disposed so as to cover the entirety of the belt layer 7, and the reinforcing layer on the outer side in the tire radial direction is disposed so as only to cover the end portions in the tire width direction of the belt layer 7. Alternatively, for example, a configuration may be used where the belt reinforcing layer 8 has two reinforcing layers, where each of the reinforcing layers is disposed so as only to cover the end portions in the tire width direction of the belt layer 7. In other words, the belt reinforcing layer 8 overlaps with at least the end portions in the tire width direction of the belt layer 7. Additionally, the belt reinforcing layer 8 is provided by winding band-like (e.g. with a width of 10 mm) strip material in the tire circumferential direction.

Figure 2:
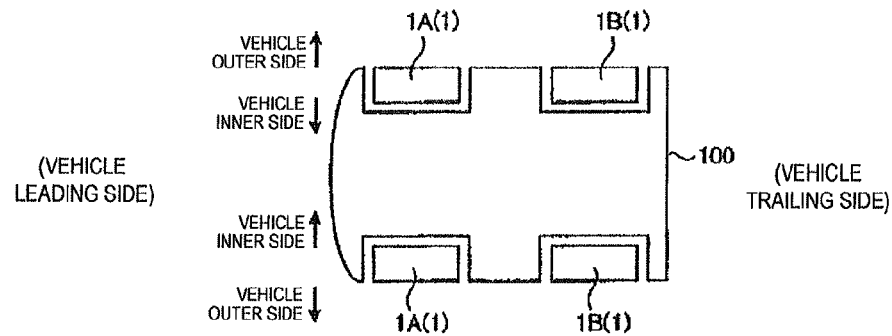
FIG. 2 is a schematic plan view of a state in which the pneumatic tire unit according to the embodiment of the present technology is mounted on a vehicle.
Figure 3:
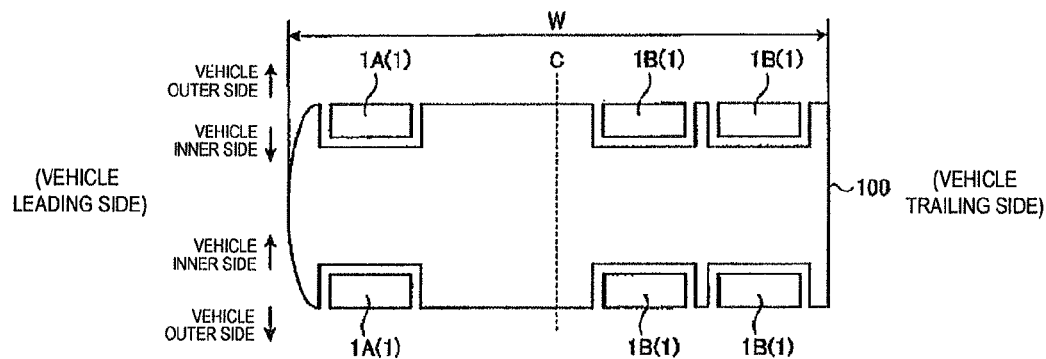
FIG. 3 is a schematic plan view of a state in which the pneumatic tire unit according to the embodiment of the present technology is mounted on a vehicle.
Figure 4:
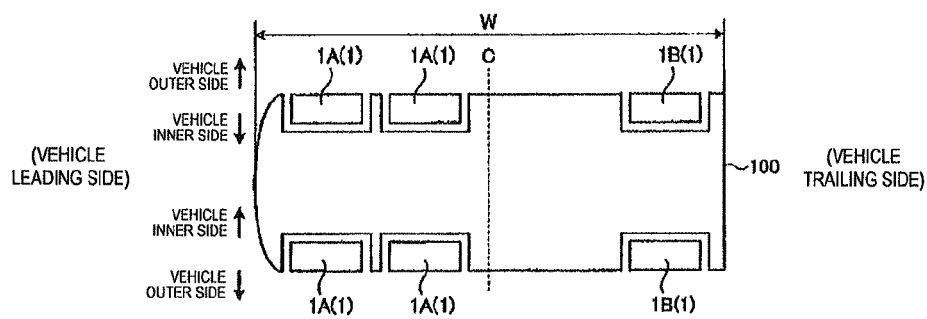
FIG. 4 is a schematic plan view of a state in which the pneumatic tire unit according to the embodiment of the present technology is mounted on a vehicle.
Figure 5:
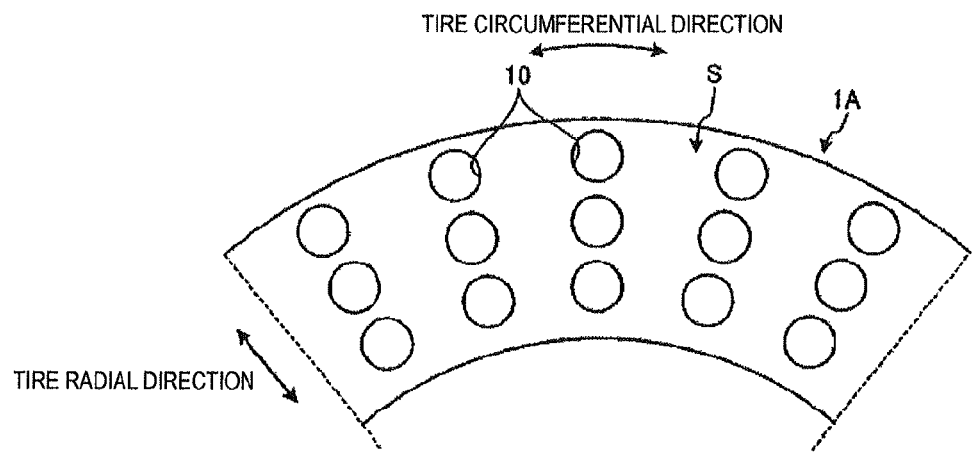
FIG. 5 is a partial perspective view of a front tire, seen from a tire width direction.
Figure 6:
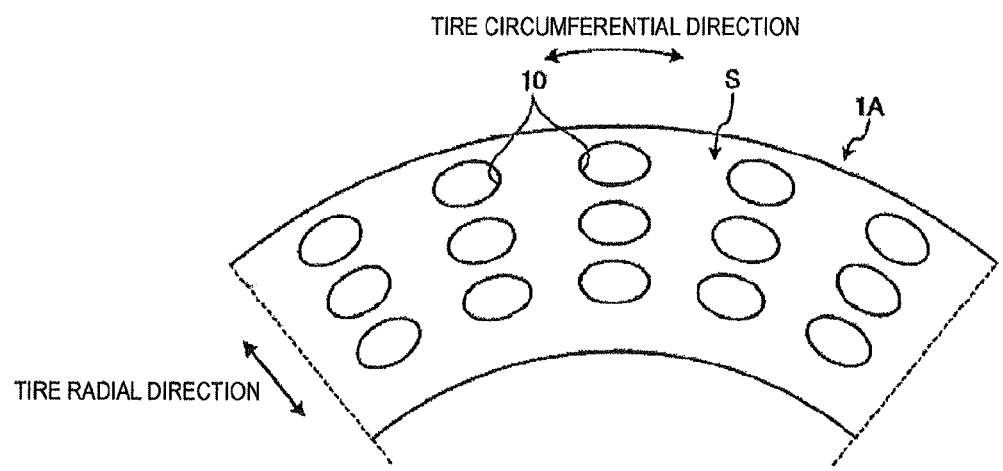
FIG. 6 is a partial perspective view of a front tire, seen from the tire width direction.
Figure 7:
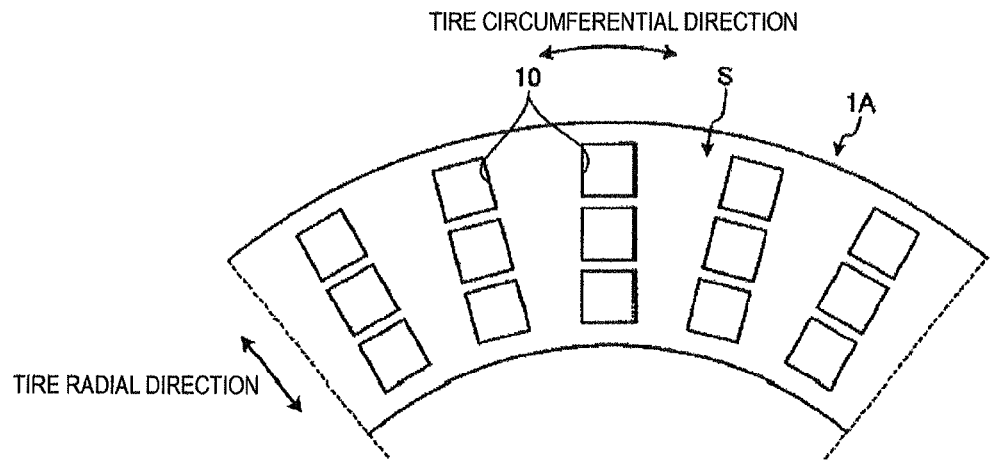
FIG. 7 is a partial perspective view of a front tire, seen from the tire width direction.
Figure 8:
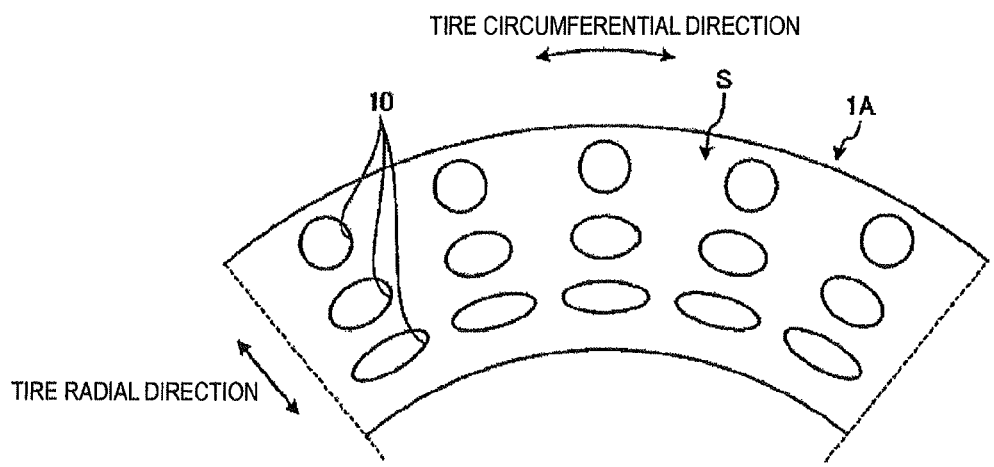
FIG. 8 is a partial perspective view of a front tire, seen from the tire width direction.
Figure 9:
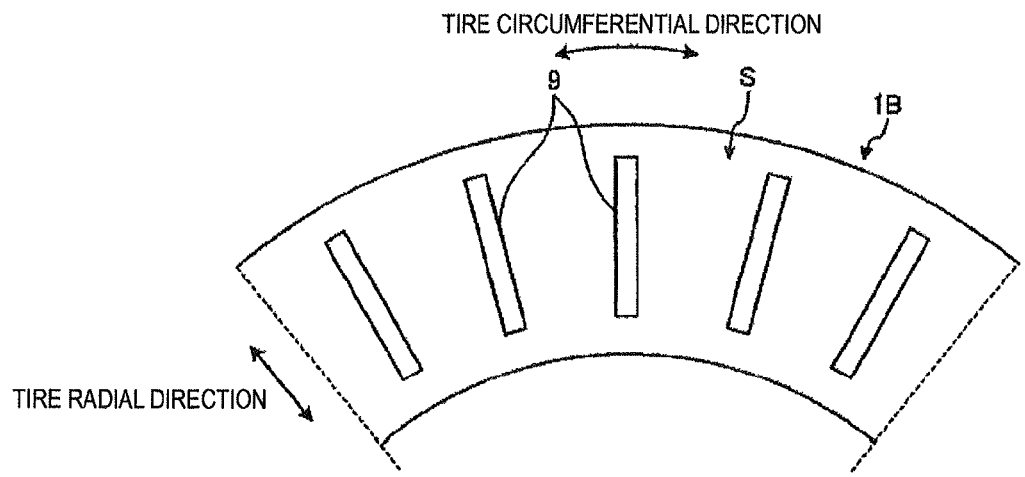
FIG. 9 is a partial perspective view of a rear tire, seen from the tire width direction.
Figure 10:
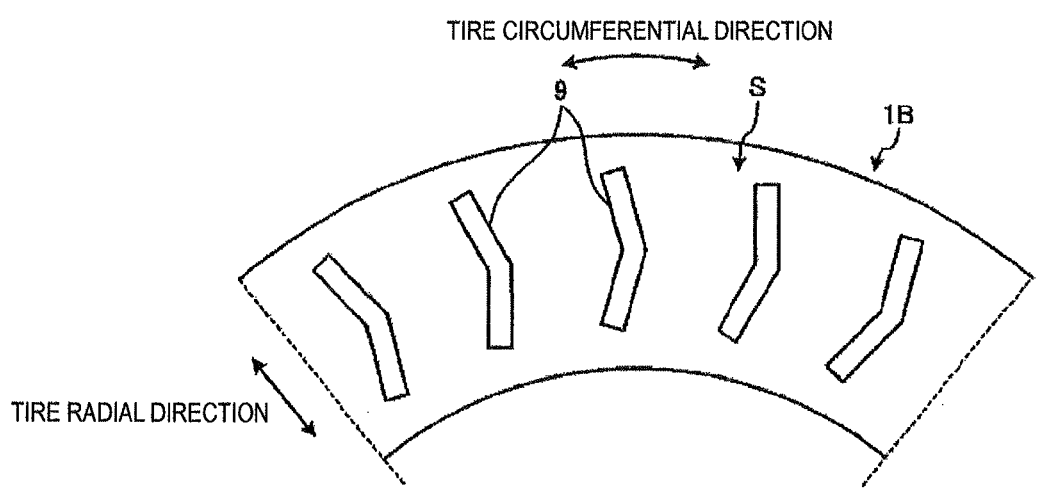
FIG. 10 is a partial perspective view of a rear tire, seen from the tire width direction.
Figure 11:
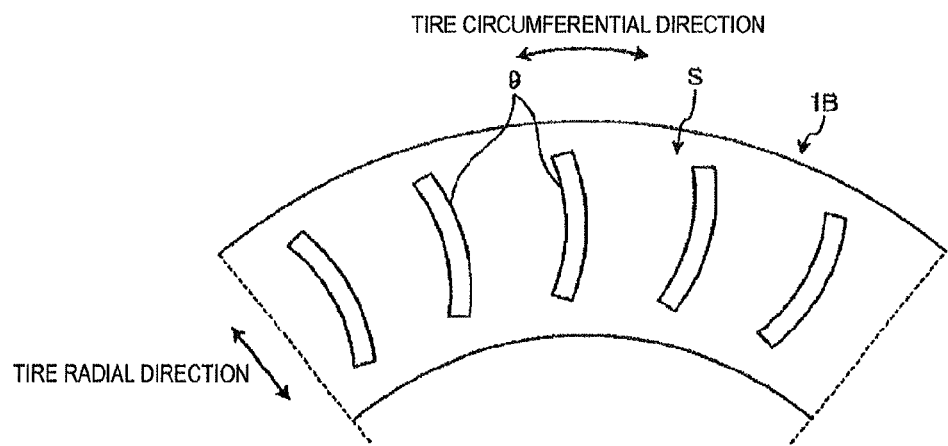
FIG. 11 is a partial perspective view of a rear tire, seen from the tire width direction.
Figure 12:
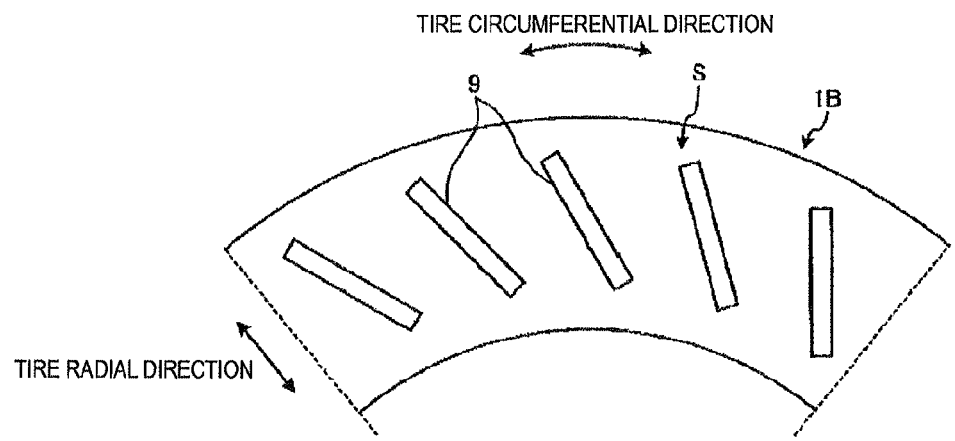
FIG. 12 is a partial perspective view of a rear tire, seen from the tire width direction.

FIGS. 2 to 4 are schematic plan views of states in which the pneumatic tire unit according to the embodiment of the present technology is mounted on vehicles. With the pneumatic tire unit of this embodiment, the pneumatic tire 1 includes a front tire 1A to be mounted on a leading side of a vehicle 100, and a rear tire 1B to be mounted on a trailing side of the vehicle 100. Here, as illustrated in FIGS. 2 to 4, the front tire 1A is the pneumatic tire 1 to be mounted at least on the frontmost side of the vehicle 100, and the rear tire 1B is the pneumatic tire 1 to be mounted at least on the backmost side of the vehicle 100. As illustrated in FIGS. 3 and 4, in cases where three or more of the pneumatic tire 1 are disposed in an anterioposterior direction of the vehicle 100, with the pneumatic tires 1 positioned intermediately in the anterioposterior direction of the vehicle 100, the pneumatic tire 1 having a rotational axis (not illustrated) positioned closer to the leading side than a center C in the anterioposterior direction of the vehicle 100, that is, the pneumatic tire 1 having a rotational axis positioned closer to the leading side than half of an entire length W is referred to as the front tire 1A; and the pneumatic tire 1 having a rotational axis (not illustrated) positioned closer to the center C in the anterioposterior direction of the vehicle 100, that is, the pneumatic tire 1 having a rotational axis (not illustrated) positioned closer to the trailing side than half of the entire length W is referred to as the rear tire 1B. The front tire 1A and the rear tire 1B described above have designated mounting locations with respect to the vehicle 100 and, these designations, while not explicitly illustrated in the drawings, can be shown via indicators provided on the side wall portions 4. Thus, the pneumatic tire unit of this embodiment includes and is constituted by the front tire 1A and the rear tire 1B which have designated mounting locations with respect to the vehicle 100. Additionally, the pneumatic tire unit may include and be constituted by the front tires 1A and the rear tires 1B of both sides of the vehicle 100, or may include and be constituted by the front tire 1A and the rear tire 1B for one side of the vehicle 100.

FIGS. 5 to 8 are partial perspective views of the front tire, seen from the tire width direction. FIGS. 9 to 12 are partial perspective views of the rear tire, seen from the tire width direction. As illustrated in FIGS. 5 to 8, with the front tire 1A, a plurality of recesses 10, recessed from a surface of a tire side portion S toward the inner side of the tire, is provided in the tire side portion S. Additionally, as illustrated in FIGS. 9 to 12, with the rear tire 1B, a plurality of protrusions 9, protruding from the surface of the tire side portion S toward the outer side of the tire, is provided on the tire side portion S.

Here, the "tire side portion S" refers to, in FIG. 1, the outer side in the tire width direction from a ground contact edge T of the tread portion 2 or, in other words, a surface that uniformly continues in a range of the outer side in the tire radial direction from a rim check line L. Additionally, the "ground contact edge T" refers to both outermost edges in the tire width direction of a region in which the tread surface 21 of the tread portion 2 of the pneumatic tire 1 contacts the road surface when the pneumatic tire 1 is assembled on a regular rim and filled with regular inner pressure and 70% of a regular load is applied, and the ground contact edge T continues in the tire circumferential direction. Moreover, the "rim check line L" refers to a line used to confirm whether the tire has been assembled on the rim correctly and, typically, is an annular convex line closer to the outer side in the tire radial direction than a rim flange and continues in the tire circumferential direction along a portion adjacent to the rim flange on a front side surface of the bead portions 5.

Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO.

The recesses 10 are, for example, as illustrated in FIGS. 5 to 8, disposed in a range of the tire side portion S at a predetermined pitch in the tire radial direction and the tire circumferential direction. An opening shape of the recesses 10 opening at the surface of the tire side portion S may be circular (see FIG. 5), oval (see FIG. 6), elliptical, polygonal (see FIG. 7), or the like. Additionally, a combination of various opening shapes may be used for the recesses 10 (see FIG. 8). Moreover, while not explicitly illustrated in the drawings, a cross-sectional shape of the recesses 10 may be semicircular, semi-oval, semi-elliptical, rounded cone shaped, rectangular, or the like. Note that with the recesses 10, as illustrated in FIGS. 5 to 8, rows of recesses disposed in line in the tire radial direction are disposed in lines in the tire circumferential direction at a predetermined pitch, but the recesses 10 may be disposed in a staggered manner in the tire radial direction and the tire circumferential direction.

Figure 13:
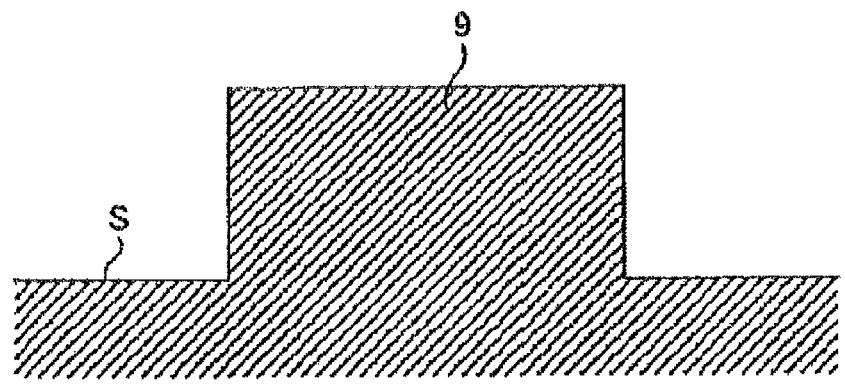
FIG. 13 is a cross-sectional view of a protrusion.
Figure 14:
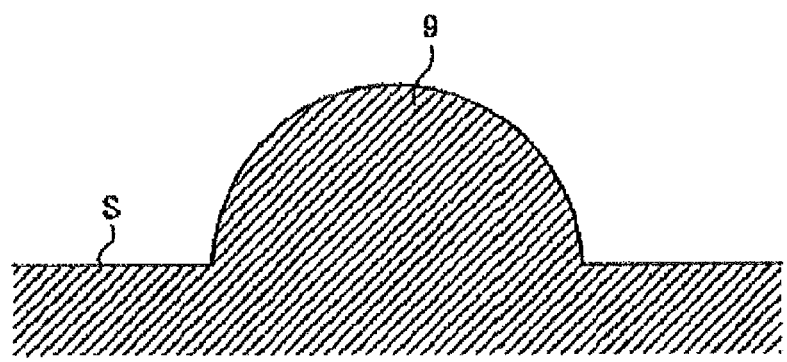
FIG. 14 is a cross-sectional view of a protrusion.
Figure 15:
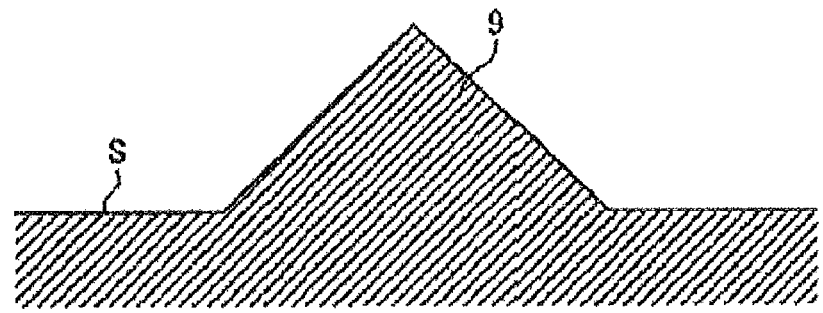
FIG. 15 is a cross-sectional view of a protrusion.
Figure 16:
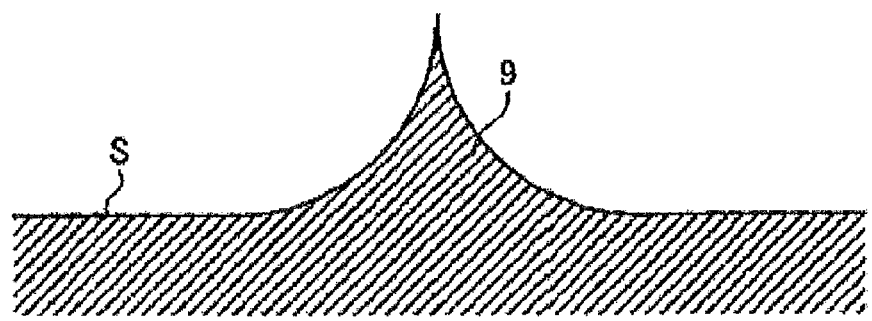
FIG. 16 is a cross-sectional view of a protrusion.

The protrusions 9 are, for example, as illustrated in FIGS. 9 to 12, formed as protrusions that are formed from a rubber material (may be the rubber material forming the tire side portion S or a rubber material different from said rubber material) in a form protruding in the tire radial direction in a range of the tire side portion S, and are disposed in the tire circumferential direction at a predetermined pitch. The protrusions 9 are formed so as to have, in the tire radial direction, a linear shape (see FIG. 9), a bent shape (see FIG. 10), a curved shape (see FIG. 11), or the like. Additionally, the protrusions 9 are formed so as to incline with respect to the tire radial direction (see FIG. 12). In FIGS. 9 to 12, the protrusions 9 are formed as a single protrusion in the tire radial direction in the range of the tire side portion S, but may be plurally divided in the longitudinal direction. In cases where the protrusions 9 are divided, another protrusion 9 lined up in the tire circumferential direction thereof may be disposed so as to overlap, in the tire circumferential direction, a division of a protrusion 9 adjacent in the tire circumferential direction. Additionally, an end portion of the protrusions 9 may protrude smoothly from the surface of the tire side portion S or may protrude abruptly from the surface of the tire side portion S. Moreover, as illustrated in the cross-sectional views of the protrusion 9 (FIGS. 13 to 16), a cross-sectional shape intersecting the longitudinal direction of the protrusions 9 is formed so as to be rectangular (see FIG. 13), semicircular (see FIG. 14), semi-oval, semi-elliptical, triangular (see FIG. 15), trapezoidal, or, as illustrated in FIG. 16, at least a portion of the cross-sectional shape has an arc. Cases where the cross-sectional shape has a concave arc as illustrated in FIG. 16 are preferable because increases in rubber volume due to the provision of the protrusions 9 can be suppressed. Furthermore, the cross-sectional shape in the longitudinal direction of the protrusions 9 may be formed so as to be uniform, or the cross-sectional shape in the longitudinal direction may be formed so as to vary.

Thus, the pneumatic tire unit of this embodiment includes the front tire 1A to be mounted on the leading side of the vehicle 100, and the rear tire 1B to be mounted on the trailing side of the vehicle 100. In this pneumatic tire unit, the plurality of recesses 10 is provided in at least one tire side portion S of the front tire 1A, and the plurality of protrusions 9 is provided on at least one tire side portion S of the rear tire 1B.

Air flow from the leading side toward the trailing side of the vehicle 100 is generated by the traveling of the vehicle 100. At the front tire 1A on the leading side of the vehicle 100, passing air is agitated by the recesses 10 and a turbulent flow boundary layer is generated at the tire side portion S of the front tire 1A. As a result, the expansion of air toward the outer side of the vehicle 100 is suppressed. On the other hand, at the rear tire 1B on the trailing side of the vehicle 100, passing air is agitated by the protrusions 9 and a turbulent flow boundary layer is generated at the tire side portion S of the rear tire 1B. As a result, the expansion of air toward the outer side of the vehicle 100 is suppressed. Moreover, at the rear tire 1B, the air is agitated and rectified by the protrusions 9. Thereby, air will not easily collect and will be expelled backwards without being influenced by wheel housings or vehicle components. As a result, a negative pressure region that can be generated at a back surface side of the vehicle 100 is reduced, and air resistance of the vehicle is reduced. Therefore, fuel economy can be enhanced.

In cases where the pneumatic tire unit of this embodiment is mounted on the vehicle 100, orientations with respect to the inner side and the outer side in the tire width direction of the vehicle 100 are designated. The orientation designations, while not explicitly illustrated in the drawings, for example, can be shown via indicators provided on the side wall portions 4. Hereinafter, a side facing the inner side of the vehicle 100 when mounted on the vehicle 100 is referred to as a "vehicle inner side" and a side facing the outer side of the vehicle 100 is referred to as a "vehicle outer side". Note that the designations of the vehicle inner side and the vehicle outer side are not limited to cases when mounted on the vehicle 100. For example, in cases when assembled on a rim, orientation of the rim with respect to the inner side and the outer side of the vehicle 100 in the tire width direction is set. Therefore, in cases when the pneumatic tire 1 (the front tire 1A and the rear tire 1B) is assembled on a rim, the orientation with respect to the inner side (vehicle inner side) and the outer side (vehicle outer side) of the vehicle 100 in the tire width direction is designated.

With the pneumatic tire unit in which the vehicle inner/outer orientation when mounted on the vehicle 100 is indicated, the recesses 10 are preferably provided in at least the tire side portion S of the vehicle outer side of the front tire 1A.

According to this pneumatic tire unit, because the separation of air on the vehicle outer side is greater than that on the vehicle inner side, the recesses 10 are provided in the tire side portion S of the vehicle outer side of the front tire 1A and, thereby, a prominent effect of suppressing the expansion of air to the outer side of the vehicle 100 can be obtained. As a result, the air resistance of the vehicle is further reduced and, therefore, fuel economy can be even further enhanced.

With the pneumatic tire unit in which the vehicle inner/outer orientation when mounted on the vehicle 100 is indicated, the protrusions 9 are preferably provided on at least the tire side portion S of the vehicle inner side of the rear tire 1B.

According to this pneumatic tire unit, because air tends to collect more easily on the vehicle inner side than on the vehicle outer side, the protrusions 9 are provided on the tire side portion S of the vehicle inner side of the rear tire 1B and, thereby a prominent effect of expelling air backwards without being influenced by the wheel housings or the vehicle components can be obtained. As a result, the air resistance against the vehicle is further reduced and, therefore, fuel economy can be even further enhanced. Note that by further providing the recesses 10 in the tire side portion S of the vehicle outer side in the rear tire 1B, the expansion of air to the outer side of the vehicle 100 is further suppressed and, thereby, air resistance of the vehicle is further reduced. Therefore, fuel economy can be further enhanced.

With the pneumatic tire unit in which the vehicle inner/outer orientation when mounted on the vehicle 100 is indicated, providing the recesses 10 in at least the tire side portion S of the vehicle outer side of the front tire 1A and providing the protrusions 9 in at least the tire side portion S of the vehicle inner side of the rear tire 1B are preferable because the air resistance of the vehicle is reduced and a prominent effect of further enhancing fuel economy can be obtained.

Additionally, with the pneumatic tire unit of this embodiment, as illustrated in FIG. 1, the recesses 10 are preferably provided at least between the maximum tire width position M and the ground contact edge T in the tire side portion S.

The region between the maximum tire width position M and the ground contact edge T in the tire side portion S is a region on the outer side in the tire radial direction of the tire side portion S, and air flow that recirculates from the side first arrives at this region. Therefore, by providing the recesses 10 in said region of the front tire 1A, the separation of air can be suppressed at an early stage, the point where the air separates can be offset farther backwards, and the flow of air can be retained near the vehicle 100. Therefore, a prominent effect of suppressing the expansion of air to the outer side of the vehicle 100 can be obtained.

Additionally, with the pneumatic tire unit of this embodiment, as illustrated in FIG. 1, the protrusions 9 are preferably provided at least between the maximum tire width position M and the ground contact edge T in the tire side portion S.

The region between the maximum tire width position M and the ground contact edge T in the tire side portion S is a region on the outer side in the tire radial direction of the tire side portion S, and rotation speed of this region in the tire side portion S is relatively fast. Therefore, by providing the protrusions 9 in said region of the rear tire 1B, more turbulent flow can be generated, and a prominent effect of expelling air backwards without being influenced by the wheel housings or the vehicle components can be obtained.

Note that with the pneumatic tire unit of this embodiment, as illustrated in FIG. 1, the recesses 10 and the protrusions 9 are preferably provided between the maximum tire width position M and the ground contact edge T of the tire side portion S because a prominent effect of suppressing the expansion of air to the outer side of the vehicle 100 will be obtained and a prominent effect of expelling air backwards without being influenced by the wheel housings or the vehicle components will be obtained.

With the pneumatic tire unit of this embodiment, a protruding height of the protrusions 9 is preferably not less than 0.5 mm and not more than 10.0 mm.

Figure 17:
FIG. 17 is an explanatory drawing illustrating the flow of air around a protrusion having a height that is less than or equal to the prescribed range.
Figure 18:
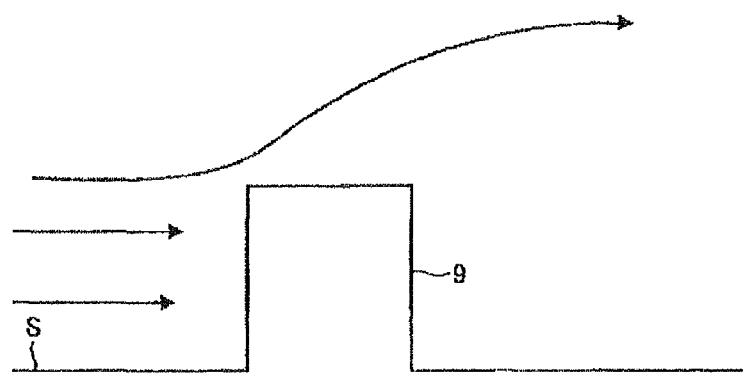
FIG. 18 is an explanatory drawing illustrating the flow of air around a protrusion having a height that is greater than or equal to the prescribed range.
Figure 19:
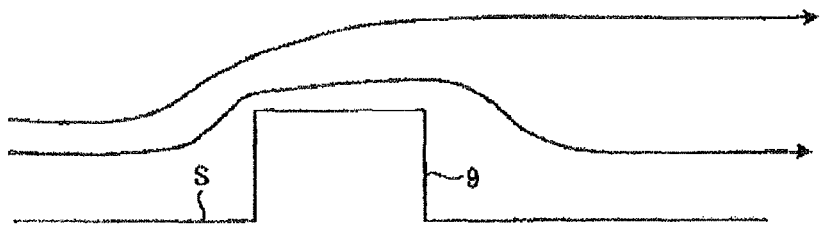
FIG. 19 is an explanatory drawing illustrating the flow of air around a protrusion having a height in the prescribed range.

If the height of the protrusions 9 is less than 0.5 mm, as illustrated in the explanatory drawing of FIG. 17 that depicts the flow of air around a protrusion having a height that is less than or equal to the stipulated range, the range of the protrusions 9 that contacts the flow of air will be small and, as a result, it will be difficult to make the flow of air at the back of the protrusions 9 turbulent and the effect of expelling air backwards will decline. If the height of the protrusions 9 exceeds 10.0 mm, as illustrated in the explanatory drawing of FIG. 18 that depicts the flow of air around a protrusion having a height that is greater than or equal to the stipulated range, the range of the protrusions 9 that contacts the flow of air will be large and, as a result, the flow of air at the back of the protrusions 9 will tend to expand and the effect of expelling air backwards will decline. On this point, with the pneumatic tire unit of this embodiment, as illustrated in the explanatory drawing of FIG. 19 that depicts the flow of air around a protrusion having a height that is within the stipulated range, the protrusions 9 appropriately contact the flow of air and, thereby, the flow of air at the back of the protrusions 9 is made appropriately turbulent. Therefore, a prominent effect of expelling air backwards can be obtained. Note that the protruding height of the protrusions 9 is preferably not less than 1.0 mm and not more than 5.0 mm because a prominent effect of expelling air backwards will be obtained.

With the pneumatic tire unit of this embodiment, the recesses 10 are preferably disposed so that a volume progressively varies in a tire radial direction.

Figure 20:
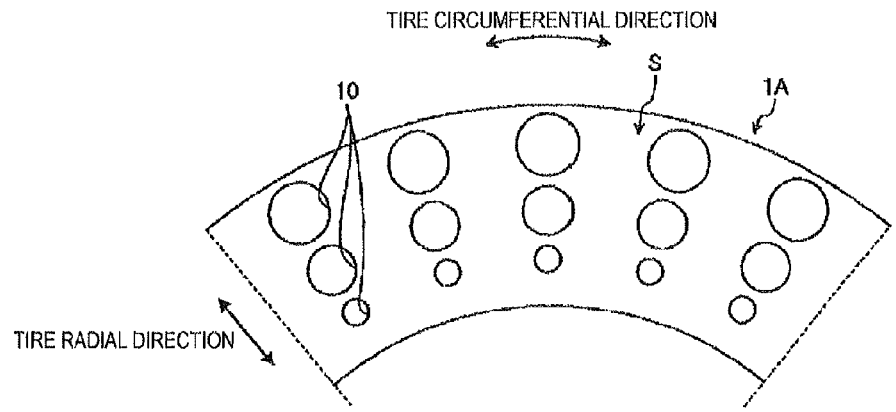
FIG. 20 is a partial perspective view of a front tire, seen from the tire width direction.
Figure 21:
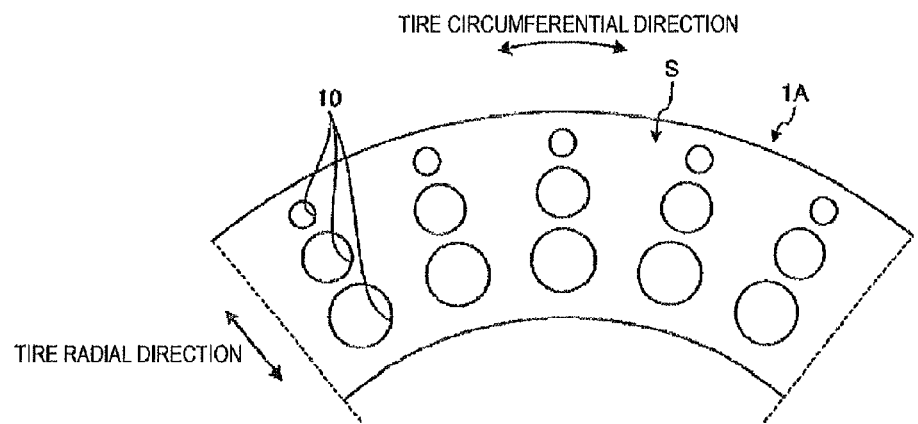
FIG. 21 is a partial perspective view of a front tire, seen from the tire width direction.

FIGS. 20 and 21 are partial perspective views of the front tire, seen from the tire width direction. The volume of the recesses 10 varies depending on the depth of the recesses 10 and an area of the openings of the recesses 10. For example, FIG. 20 illustrates a state in which the depth of the recesses 10 is constant and the area of the openings varies so as to progressively increase toward the outer side in the tire radial direction. The outer side in the tire radial direction is where air flow that recirculates from the side first arrives. Therefore, by disposing the recesses 10 such that the volume varies so as to progressively increase in the tire radial direction, the separation of air can be suppressed at an early stage, the point where the air separates can be offset farther backwards, and the flow of air can be retained near the vehicle 100. Therefore, a prominent effect of suppressing the expansion of air to the outer side of the vehicle 100 can be obtained. Additionally, rotation speed of the outer side in the tire radial direction in the tire side portion S is relatively fast. Therefore, as illustrated in FIG. 20, by disposing the recesses 10 such that the volume varies so as to progressively increase in the tire radial direction, more turbulent flow can be generated and a prominent effect of suppressing the expansion of air to the outer side of the vehicle 100 can be obtained. Note that in cases where the recesses 10 are provided in the rear tire 1B, it is possible to obtain the same effects using the same configuration.

On the other hand, FIG. 21 illustrates a state in which the depth of the recesses 10 is constant and the area of the openings varies so as to progressively increase toward the inner side in the tire radial direction. The rotation speed of the tire side portion S becomes relatively slow with proximity to the inner side in the tire radial direction and, therefore, the volume of the recesses 10 closer to this region is made larger. As a result, even though the rotation speed at the inner side in the tire radial direction is slow, turbulent flow can be generated and a prominent effect of suppressing the expansion of air to the outer side of the vehicle 100 can be obtained. Moreover, the inner side in the tire radial direction of the tire side portion S is a region in which a large amount of deformation occurs due to compression of the tire, and heat buildup is relatively great. Therefore, by configuring the volume of the recesses 10 to be great in this region, the flow of air on the surface of the tire side portion S can be pulled in, and an effect of enhancing heat dissipation can be obtained. Note that in cases where the recesses 10 are provided in the rear tire 1B, it is possible to obtain the same effects using the same configuration.

With the pneumatic tire unit of this embodiment, a depth of the recesses 10 is preferably not less than 0.5 mm and not more than 5.0 mm.

If the depth of the recesses 10 is less than 0.5 mm, a range where an inner surface of the recesses 10 contacts the air will be small and, as a result, it will be difficult to make the flow of air turbulent. Additionally, if the depth of the recesses 10 exceeds 5.0 mm, the range where the inner surface of the recesses 10 contacts the flow of air will be excessive and, in addition to the air resistance tending to increase, the original rubber volume in the region where the recesses 10 are provided will be increased in order to accommodate the depth of the recesses 10, which will lead to an increase in tire weight. On this point, according to the pneumatic tire unit of this embodiment, the inner surface of the recesses 10 appropriately contacts the air and, therefore, the flow of air can be appropriately made turbulent. As a result, a prominent effect of reducing the air resistance of the vehicle can be obtained. Note that the range of the depth of the recesses 10 that is not less than 0.5 mm and not more than 5.0 mm is preferable for pneumatic tires for passenger cars. However, the range is not limited thereto for pneumatic tires having large diameters such as heavy duty pneumatic tires, and the range of the depth may exceed that for passenger cars. Note that in cases where the recesses 10 are provided in the rear tire 1B, it is possible to obtain the same effects using the same configuration.

With the pneumatic tire unit of this embodiment, a maximum diameter dimension of openings of the recesses 10 is preferably not less than 1.0 mm and not more than 8.0 mm.

When the opening of the recesses 10 is seen from the front, the maximum diameter dimension of the recesses 10 is a dimension where an opening width passing through the center of the recesses 10 is greatest. If the maximum diameter dimension of the recesses 10 is less than 1.0 mm, the range of the recesses 10 that contacts the air will be small and, as a result, it will be difficult to make the flow of air turbulent. On the other hand, if the maximum diameter dimension of the recesses 10 exceeds 8.0 mm, the range of the recesses 10 that contacts the air will be excessive, and air resistance will tend to increase. On this point, according to the pneumatic tire unit of this embodiment, the recesses 10 appropriately contact the air and, therefore, the flow of air can be appropriately made turbulent. As a result, a prominent effect of reducing the air resistance of the vehicle 100 can be obtained. Note that in cases where the recesses 10 are provided in the rear tire 1B, it is possible to obtain the same effects using the same configuration.

Note that with the pneumatic tire unit described above, the recesses 10 are provided in the front tire 1A and the protrusions 9 are provided on the rear tire 1B. However, as a rim assembled pneumatic tire assembly unit, by further providing the recesses 10 in the rim of a front tire assembly and further providing the protrusions 9 on a rim of a rear tire assembly, the air flow around the tire can be further improved, the air resistance of the vehicle can be reduced, and fuel economy can be further enhanced.

The pneumatic tire unit described above can be used as a passenger car pneumatic tire and also as a heavy duty or run-flat pneumatic tire. When used as a passenger car pneumatic tire, the effects described above can be obtained. When used as a heavy duty pneumatic tire, particularly under heavy loads, increases in temperature when the tire side portion S of the front tire 1A is compressed are suppressed by the recesses 10, and deformations of the tire when the tire side portion S of the rear tire 1B is compressed are further suppressed by the protrusions 9. Therefore, durability is enhanced. Also, when used as a run-flat pneumatic tire, particularly when punctured, increases in temperature when the tire side portion S of the front tire 1A is compressed are suppressed by the recesses 10, and deformations of the tire when the tire side portion S of the rear tire 1B is compressed are further suppressed by the protrusions 9. Therefore, durability is enhanced.

EXAMPLES

In the examples, performance testing for fuel economy was performed on a plurality of types of pneumatic tire units under different conditions (see FIGS. 22 to 27).

In this performance testing, a pneumatic tire unit having a tire size of 185/65R15 was assembled on a regular rim and inflated to a regular inner pressure. Then, the pneumatic tire unit was mounted on a compact front-wheel drive (four wheeled) vehicle having an engine displacement of 1,500 cc+motor assist drive.

Method of evaluating fuel economy: Fuel economy was measured for a case where the test vehicle described above was driven 50 laps on a 2 km (total length) test course at a speed of 100 km/h. Based on the measurement results, the fuel economy was indexed with the index score of the pneumatic tire of the Conventional Example (100.0) being a reference. Greater index scores indicate enhanced fuel economy, and scores of 101.0 or greater indicate a prominent effect.

In FIG. 22, the pneumatic tire unit of the Conventional Example ("Cony. Ex.") does not include the protrusions or the recesses of the front tire or the rear tire. The pneumatic tire unit of Comparative Example 1 ("Comp. Ex. 1") includes the protrusions on the vehicle inner side and the vehicle outer side of the front tire, and does not include the protrusions or the recesses of the rear tire. The pneumatic tire unit of Comparative Example 2 includes the recesses on the vehicle inner side and the vehicle outer side of the front tire, and does not include the protrusions or the recesses of the rear tire. The pneumatic tire unit of Comparative Example 3 does not include the protrusions or the recesses of the front tire, and includes the protrusions on the vehicle inner side and the vehicle outer side of the rear tire. The pneumatic tire unit of Comparative Example 4 does not include the protrusions or the recesses of the front tire, and includes the recesses on the vehicle inner side and the vehicle outer side of the rear tire. The pneumatic tire unit of Comparative Example 5 includes the protrusions on the vehicle inner side and the vehicle outer side of the front tire, and includes the protrusions on the vehicle inner side and the vehicle outer side of the rear tire. The pneumatic tire unit of Comparative Example 6 includes the recesses on the vehicle inner side and the vehicle outer side of the front tire, and includes the recesses on the vehicle inner side and the vehicle outer side of the rear tire. The pneumatic tire unit of Comparative Example 7 includes the protrusions on the vehicle inner side and the vehicle outer side of the front tire, and includes the recesses on the vehicle inner side and the vehicle outer side of the rear tire.

In FIGS. 23 to 27, the pneumatic tire units of Working Examples 1 to 33 include the recesses in the front tire and the protrusions on the rear tire. As shown in FIG. 23, the pneumatic tire units of Working Examples 1 to 7 include the recesses on the vehicle inner side of the front tire and the protrusions on the vehicle outer side of the rear tire. In the pneumatic tire unit of Working Example 3, the recesses are provided between the maximum tire width position and the ground contact edge of the front tire. In the pneumatic tire unit of Working Example 4, the protrusions are provided between the maximum tire width position and the ground contact edge of the rear tire. In the pneumatic tire unit of Working Example 5, the recesses are provided between the maximum tire width position and the ground contact edge of the front tire, and the protrusions are provided between the maximum tire width position and the ground contact edge of the rear tire. In the pneumatic tire unit of Working Example 6, the volume of the recesses in the tire radial direction varies so as to increase toward the outer side in the tire radial direction. In the pneumatic tire unit of Working Example 7, the volume of the recesses in the tire radial direction varies so as to increase toward the inner side in the tire radial direction.

As shown in FIGS. 24-25, the pneumatic tire units of Working Examples 8 to 13 include the recesses on the vehicle outer side of the front tire, and the protrusions on the vehicle outer side of the rear tire. In the pneumatic tire unit of Working Example 9, the recesses are provided between the maximum tire width position and the ground contact edge of the front tire. In the pneumatic tire unit of Working Example 10, the protrusions are provided between the maximum tire width position and the ground contact edge of the rear tire. In the pneumatic tire unit of Working Example 11, the recesses are provided between the maximum tire width position and the ground contact edge of the front tire, and the protrusions are provided between the maximum tire width position and the ground contact edge of the rear tire. In the pneumatic tire unit of Working Example 12, the volume of the recesses in the tire radial direction varies so as to increase toward the outer side in the tire radial direction. In the pneumatic tire unit of Working Example 13, the volume of the recesses in the tire radial direction varies so as to increase toward the inner side in the tire radial direction.

As shown in FIGS. 24-25, the pneumatic tire units of Working Examples 14 to 19 include the recesses on the vehicle inner side of the front tire, and the protrusions on the vehicle inner side of the rear tire. In the pneumatic tire unit of Working Example 15, the recesses are provided between the maximum tire width position and the ground contact edge of the front tire. In the pneumatic tire unit of Working Example 16, the protrusions are provided between the maximum tire width position and the ground contact edge of the rear tire. In the pneumatic tire unit of Working Example 17, the recesses are provided between the maximum tire width position and the ground contact edge of the front tire, and the protrusions are provided between the maximum tire width position and the ground contact edge of the rear tire. In the pneumatic tire unit of Working Example 18, the volume of the recesses in the tire radial direction varies so as to increase toward the outer side in the tire radial direction. In the pneumatic tire unit of Working Example 19, the volume of the recesses in the tire radial direction varies so as to increase toward the inner side in the tire radial direction.

As shown in FIGS. 26-27, the pneumatic tire units of Working Examples 20 to 25 include the recesses on the vehicle outer side of the front tire, and the protrusions on the vehicle inner side of the rear tire. In the pneumatic tire unit of Working Example 21, the recesses are provided between the maximum tire width position and the ground contact edge of the front tire. In the pneumatic tire unit of Working Example 22, the protrusions are provided between the maximum tire width position and the ground contact edge of the rear tire. In the pneumatic tire unit of Working Example 23, the recesses are provided between the maximum tire width position and the ground contact edge of the front tire, and the protrusions are provided between the maximum tire width position and the ground contact edge of the rear tire. In the pneumatic tire unit of Working Example 24, the volume of the recesses in the tire radial direction varies so as to increase toward the outer side in the tire radial direction. In the pneumatic tire unit of Working Example 25, the volume of the recesses in the tire radial direction varies so as to increase toward the inner side in the tire radial direction.

As shown in FIGS. 26-27, the pneumatic tire units of Working Examples 26 to 31 include the recesses on the vehicle inner side and the vehicle outer side of the front tire, and the protrusions on the vehicle inner side and the vehicle outer side of the rear tire. In the pneumatic tire unit of Working Example 27, the recesses are provided between the maximum tire width position and the ground contact edge of the front tire. In the pneumatic tire unit of Working Example 28, the protrusions are provided between the maximum tire width position and the ground contact edge of the rear tire. In the pneumatic tire unit of Working Example 29, the recesses are provided between the maximum tire width position and the ground contact edge of the front tire, and the protrusions are provided between the maximum tire width position and the ground contact edge of the rear tire. In the pneumatic tire unit of Working Example 30, the volume of the recesses in the tire radial direction varies so as to increase toward the outer side in the tire radial direction. In the pneumatic tire unit of Working Example 31, the volume of the recesses in the tire radial direction varies so as to increase toward the inner side in the tire radial direction.

As shown in FIGS. 26-27, the pneumatic tire units of Working Examples 32 and 33 include the recesses on the vehicle outer side of the front tire; and the protrusions on the vehicle inner side and the recesses on the vehicle outer side of the rear tire. In the pneumatic tire unit of Working Example 33, the recesses are provided between the maximum tire width position and the ground contact edge of the front tire, and the protrusions and the recesses are provided between the maximum tire width position and the ground contact edge of the rear tire.

As shown in the evaluation results of FIGS. 22 to 27, it is clear that the fuel economy was enhanced with the pneumatic tire units of Working Examples 1 to 33. Here, in cases where the recesses were provided in both the front and rear tires as in Comparative Example 6, the effect of making the air turbulent was small, particularly, rectifying of the air at the rear tire was small, and it was difficult to reduce the negative pressure region at the back of the vehicle. Therefore, it was difficult to obtain the effect of reducing the air resistance of the vehicle. Additionally, in cases where the protrusions were provided on both the front and rear tires as in Comparative Example 5, the air was agitated at the front tire, the influence of which led to it being difficult to obtain the effect of reducing the air resistance of the vehicle. Furthermore, in cases where the protrusions were provided on the front tire and the recesses were provided in the rear tire as in Comparative Example 7, rectifying of the air at the rear tire was small and the air was agitated at the front tire. Therefore, it was difficult to obtain the effect of reducing the air resistance of the vehicle.

What is claimed is:

1. A pneumatic tire unit comprising: a front tire to be mounted on a leading side of a vehicle, and a rear tire to be mounted on a trailing side of the vehicle; wherein
   a plurality of recesses is provided in only one tire side portion of the front tire, and a plurality of protrusions is provided on only one tire side portion of the rear tire;
   the recesses and the protrusions are disposed in a circumferential direction at a predetermined pitch;
   the protrusions are not provided in either tire side portion of the front tire;
   the recesses are not provided in either tire side portion of the rear tire;
   the recesses are provided in the tire side portion of a vehicle outer side of the front tire; and
   the protrusions are provided on the tire side portion of a vehicle inner side of the rear tire.

2. The pneumatic tire unit according to claim 1, wherein the recesses are provided at least between a maximum tire width position and a ground contact edge.

3. The pneumatic tire unit according to claim 1, wherein the protrusions are provided at least between the maximum tire width position and a ground contact edge.

4. The pneumatic tire unit according to claim 1, wherein a protruding height of the protrusions is not less than 0.5 mm and not more than 10.0 mm.

5. The pneumatic tire unit according to claim 1, wherein the recesses are disposed so that a volume progressively varies in a tire radial direction.

6. The pneumatic tire unit according to claim 5, wherein the recesses are disposed so that the volume progressively varies in the tire radial direction by progressively decreasing outwardly in the tire radial direction.

7. The pneumatic tire unit according to claim 1, wherein a depth of the recesses is not less than 0.5 mm and not more than 5.0 mm.

8. The pneumatic tire unit according to claim 1, wherein a maximum diameter dimension of openings of the recesses is not less than 1.0 mm and not more than 8.0 mm.

9. The pneumatic tire unit according to claim 1, wherein the recesses and protrusions are provided at least between a maximum tire width position and a ground contact edge.

10. The pneumatic tire unit according to claim 1, wherein:
    a protruding height of the protrusions is not less than 0.5 mm and not more than 10.0 mm;
    a depth of the recesses is not less than 0.5 mm and not more than 5.0 mm; and
    a maximum diameter dimension of openings of the recesses is not less than 1.0 mm and not more than 8.0 mm.

11. The pneumatic tire unit according to claim 1, wherein the recesses are disposed so that a volume progressively varies in a tire radial direction.

12. The pneumatic tire unit according to claim 1, wherein the recesses and protrusions are provided at least between a maximum tire width position and a ground contact edge.

13. The pneumatic tire unit according to claim 12, wherein:
    a protruding height of the protrusions is not less than 0.5 mm and not more than 10.0 mm;
    a depth of the recesses is not less than 0.5 mm and not more than 5.0 mm; and
    a maximum diameter dimension of openings of the recesses is not less than 1.0 mm and not more than 8.0 mm.

14. The pneumatic tire unit according to claim 13, wherein the recesses are disposed so that a volume progressively varies in a tire radial direction.

15. The pneumatic tire unit according to claim 1, wherein:
a protruding height of the protrusions is not less than 0.5 mm and not more than 10.0 mm;
a depth of the recesses is not less than 0.5 mm and not more than 5.0 mm; and
a maximum diameter dimension of openings of the recesses is not less than 1.0 mm and not more than 8.0 mm.

16. The pneumatic tire unit according to claim 15, wherein the recesses are disposed so that a volume progressively varies in a tire radial direction.

17. The pneumatic tire unit according to claim 1, wherein the plurality of recesses includes discrete recesses in the tire circumferential direction and discrete recesses in the tire radial direction, and wherein the plurality of protrusions includes discrete protrusions in the tire circumferential direction and discrete protrusions in the tire radial direction.

18. A pneumatic tire unit comprising: a front tire to be mounted on a leading side of a vehicle, and a rear tire to be mounted on a trailing side of the vehicle; wherein
a plurality of recesses is provided in a front tire side portion, and a plurality of protrusions is provided on a rear tire side portion;
the recesses and the protrusions are disposed in a circumferential direction at a predetermined pitch;
inner and outer sides of the front tire are devoid of the protrusions; and
inner and outer sides of the rear tire are devoid of the recesses.

* * * * *